(12) United States Patent
Barnett

(10) Patent No.: US 11,352,891 B2
(45) Date of Patent: Jun. 7, 2022

(54) METHOD FOR MANUFACTURING A COMPOSITE GUIDE VANE HAVING A METALLIC LEADING EDGE

(71) Applicant: PRATT & WHITNEY CANADA CORP., Longueuil (CA)

(72) Inventor: Barry Barnett, Unionville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/074,414

(22) Filed: Oct. 19, 2020

(65) Prior Publication Data

US 2022/0120186 A1  Apr. 21, 2022

(51) Int. Cl.
 *F01D 5/28* (2006.01)

(52) U.S. Cl.
 CPC ............. *F01D 5/288* (2013.01); *F01D 5/282* (2013.01); *F05D 2240/121* (2013.01); *F05D 2300/603* (2013.01)

(58) Field of Classification Search
 CPC ....................................................... F01D 5/282
 USPC ....................................................... 416/224
 See application file for complete search history.

(56) References Cited

U.S. PATENT DOCUMENTS

| | | | |
|---|---|---|---|
| 5,454,693 A | 10/1995 | Aubry et al. | |
| 5,462,408 A | 10/1995 | Coffy | |
| 5,569,019 A | 10/1996 | Katariya et al. | |
| 6,290,895 B1 | 9/2001 | Wang et al. | |
| 7,753,653 B2 | 7/2010 | Cairo et al. | |
| 9,217,333 B2 | 12/2015 | Berard et al. | |
| 9,534,498 B2 | 1/2017 | Lyders | |
| 9,868,235 B2 | 1/2018 | Plante et al. | |
| 10,239,241 B2 | 3/2019 | Plante et al. | |
| 10,415,399 B2 | 9/2019 | Ducharme et al. | |
| 10,569,489 B2 | 2/2020 | Marchal et al. | |
| 2011/0194941 A1* | 8/2011 | Parkin ................... | F04D 29/023 416/224 |
| 2012/0082553 A1 | 4/2012 | Eleftheriou et al. | |

(Continued)

FOREIGN PATENT DOCUMENTS

| | | |
|---|---|---|
| EP | 3064708 B1 | 9/2016 |
| EP | 3186486 B1 | 7/2017 |

(Continued)

OTHER PUBLICATIONS

Evonik, Lightweight and Strong Tapes, https://composites.evonik.com . . . , accessed on Jun. 10, 2020.

(Continued)

*Primary Examiner* — Michael L Sehn
(74) *Attorney, Agent, or Firm* — Norton Rose Fulbright Canada LLP

(57) ABSTRACT

A method of manufacturing a composite guide vane with a metallic leading edge includes receiving a layup of fiber-reinforced composite sheets of continuous, substantially parallel and non-interlaced fibers impregnated with a resin. A vane body is formed from the layup of sheets. The vane body includes a body mid portion for interacting with a fluid and a body end portion. The method includes applying a metallic sheath on part of the vane body. The metallic sheath defines a leading edge of the guide vane. The method includes overmolding a head or a foot of the guide vane onto part of the vane body and onto part of the metallic sheath.

18 Claims, 11 Drawing Sheets

(56) References Cited

U.S. PATENT DOCUMENTS

| | | | | |
|---|---|---|---|---|
| 2013/0004324 | A1* | 1/2013 | Hansen | C25D 1/006 416/224 |
| 2013/0048206 | A1* | 2/2013 | Henkle | B29C 45/0005 156/245 |
| 2014/0161621 | A1 | 6/2014 | Kray et al. | |
| 2016/0153295 | A1 | 6/2016 | Pautard et al. | |
| 2016/0167269 | A1 | 6/2016 | Pautard | |
| 2016/0208624 | A1* | 7/2016 | Smith | B33Y 80/00 |
| 2016/0258319 | A1 | 9/2016 | Turner et al. | |
| 2017/0254212 | A1 | 9/2017 | Pautard et al. | |
| 2019/0048730 | A1* | 2/2019 | Subramanian | B22C 7/02 |
| 2020/0040742 | A1 | 2/2020 | Fromonteil et al. | |

FOREIGN PATENT DOCUMENTS

| | | |
|---|---|---|
| EP | 3356650 A1 | 8/2018 |
| GB | 2556202 A | 5/2018 |
| JP | 4860941 B2 | 1/2012 |
| WO | 2015075347 A1 | 5/2015 |
| WO | 2019186029 A1 | 3/2019 |

OTHER PUBLICATIONS

English translation of International Patent Application No. WO2019186029 dated Mar. 20, 2019, https://patents.google.com/patent/WO2019186029A1/en?oq=WO2019186029A1, accessed on Oct. 21, 2020.

English translation of Europe patent document No. EP3356650 dated Aug. 8, 2018, https://patents.google.com/patent/EP3356650A1/en?oq=EP3356650A1, accessed on Oct. 21, 2020.

English translation of Europe patent document No. EP3064708 dated Sep. 7, 2016, https://patents.google.com/patent/EP3064708B1/en?oq=EP3064708B1, accessed on Oct. 21, 2020.

English translation of Europe patent document No. EP3186486 dated Jul. 5, 2017, https://patents.google.com/patent/EP3186486B1/en?oq=EP3186486B1, accessed on Oct. 22, 2020.

English translation of International Patent Application No. WO2015075347A1 dated May 28, 2015, https://patents.google.com/patent/WO2015075347A1/en?oq=WO2015075347A1, accessed on Oct. 21, 2020.

English translation of Japan patent document No. JP4860941 dated Jan. 25, 2012, https://patents.google.com/patent/JP4860941B2/en?oq=JP4860941B2, accessed on Oct. 21, 2020.

* cited by examiner

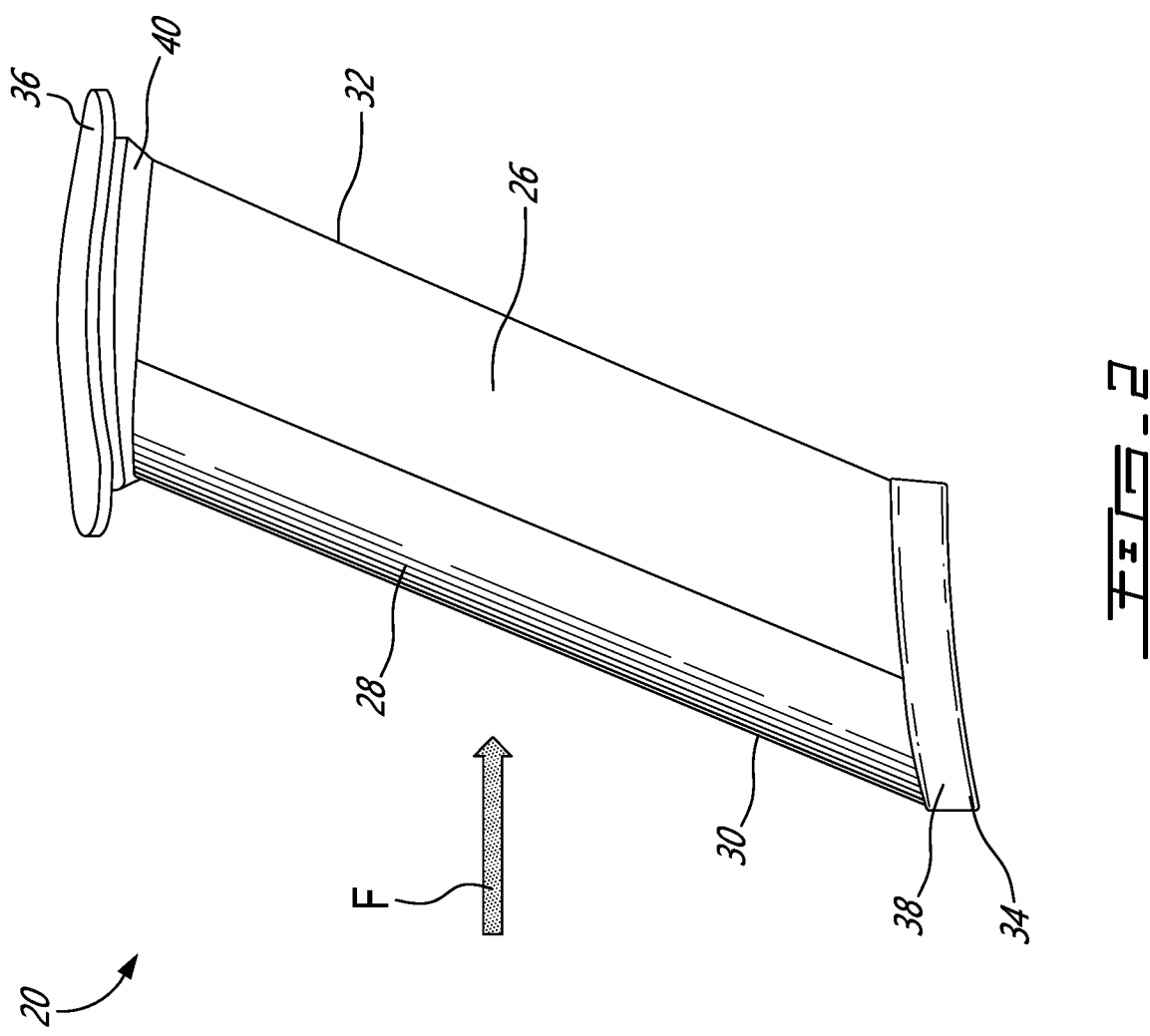

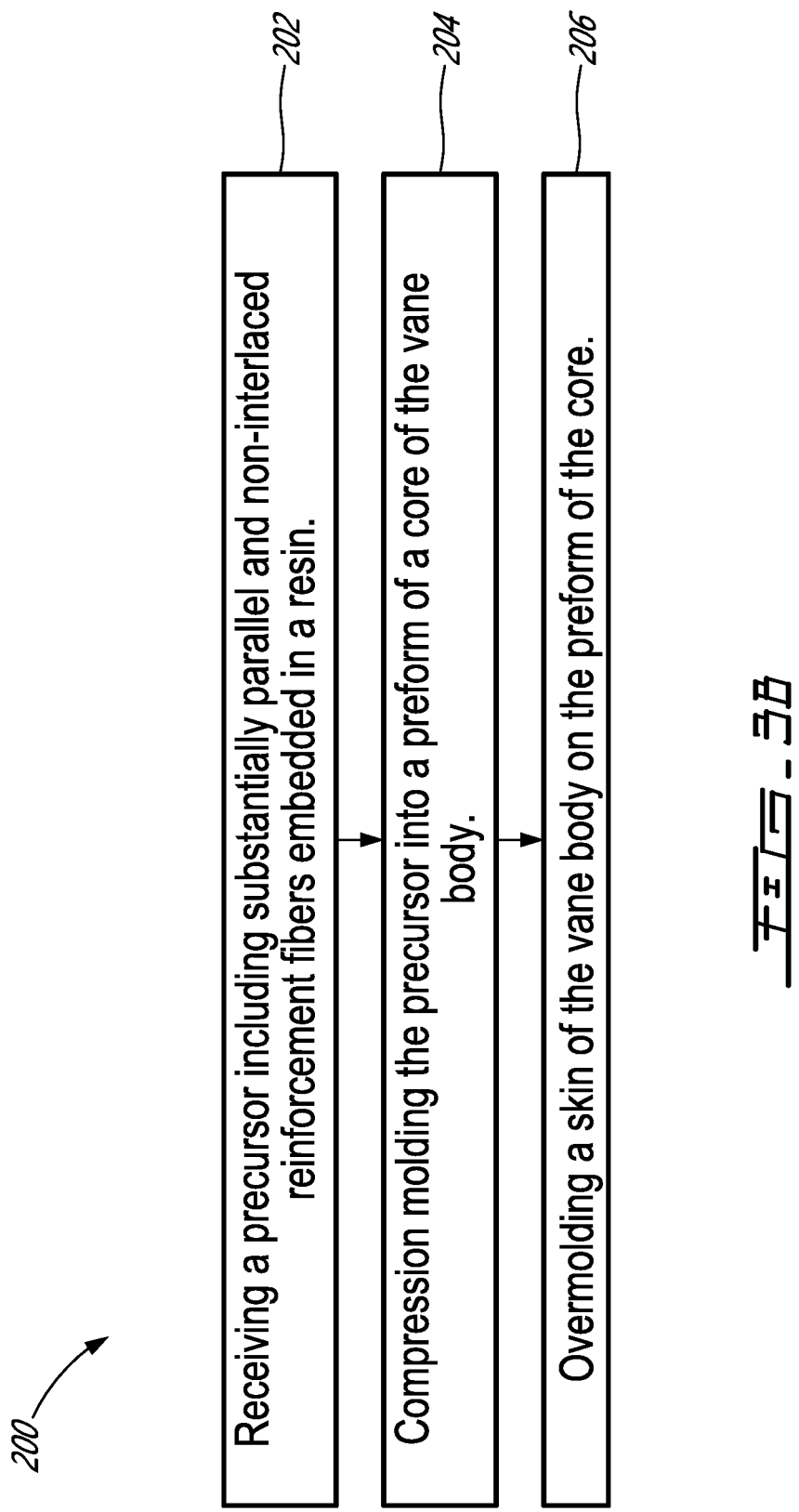

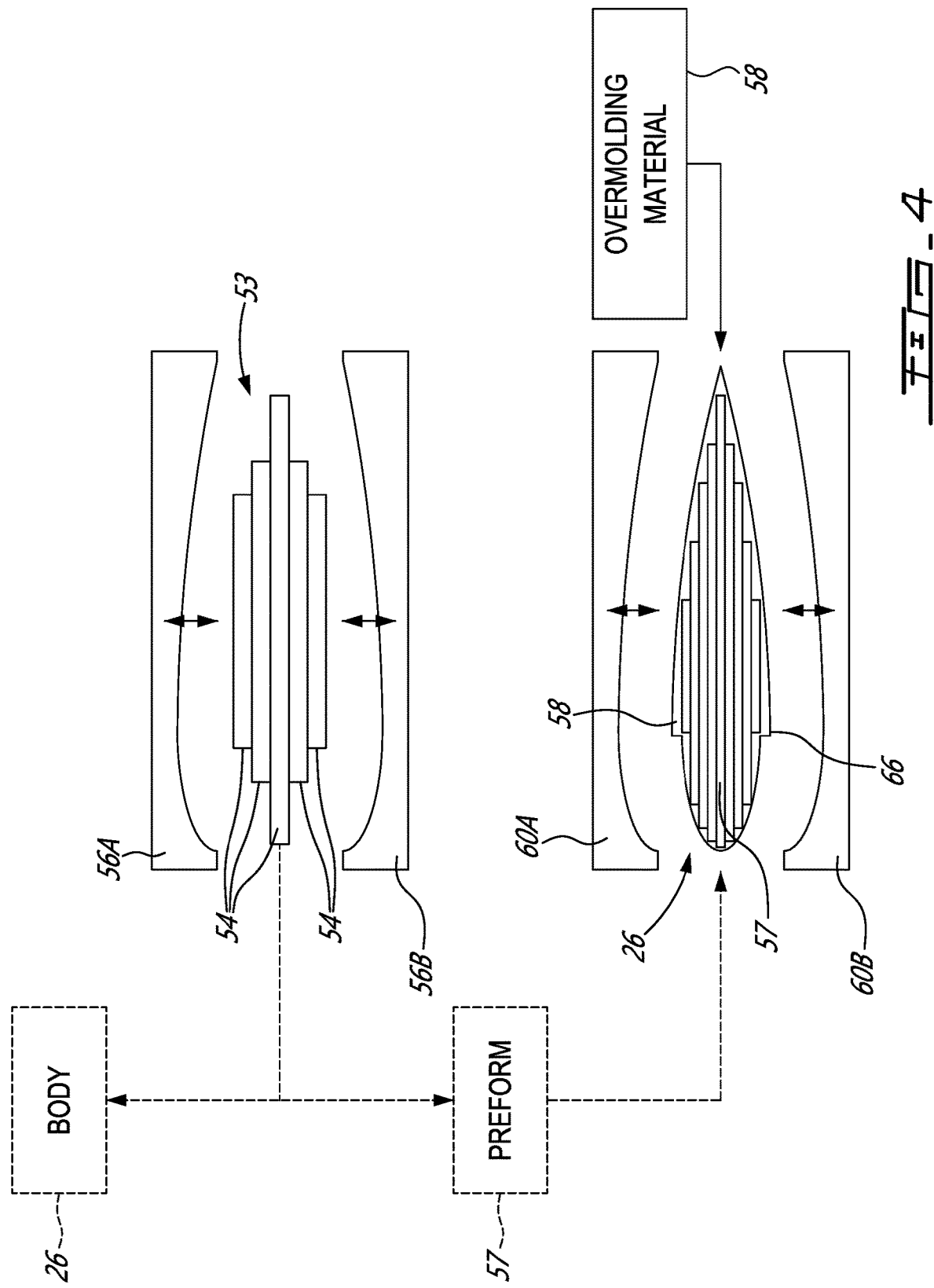

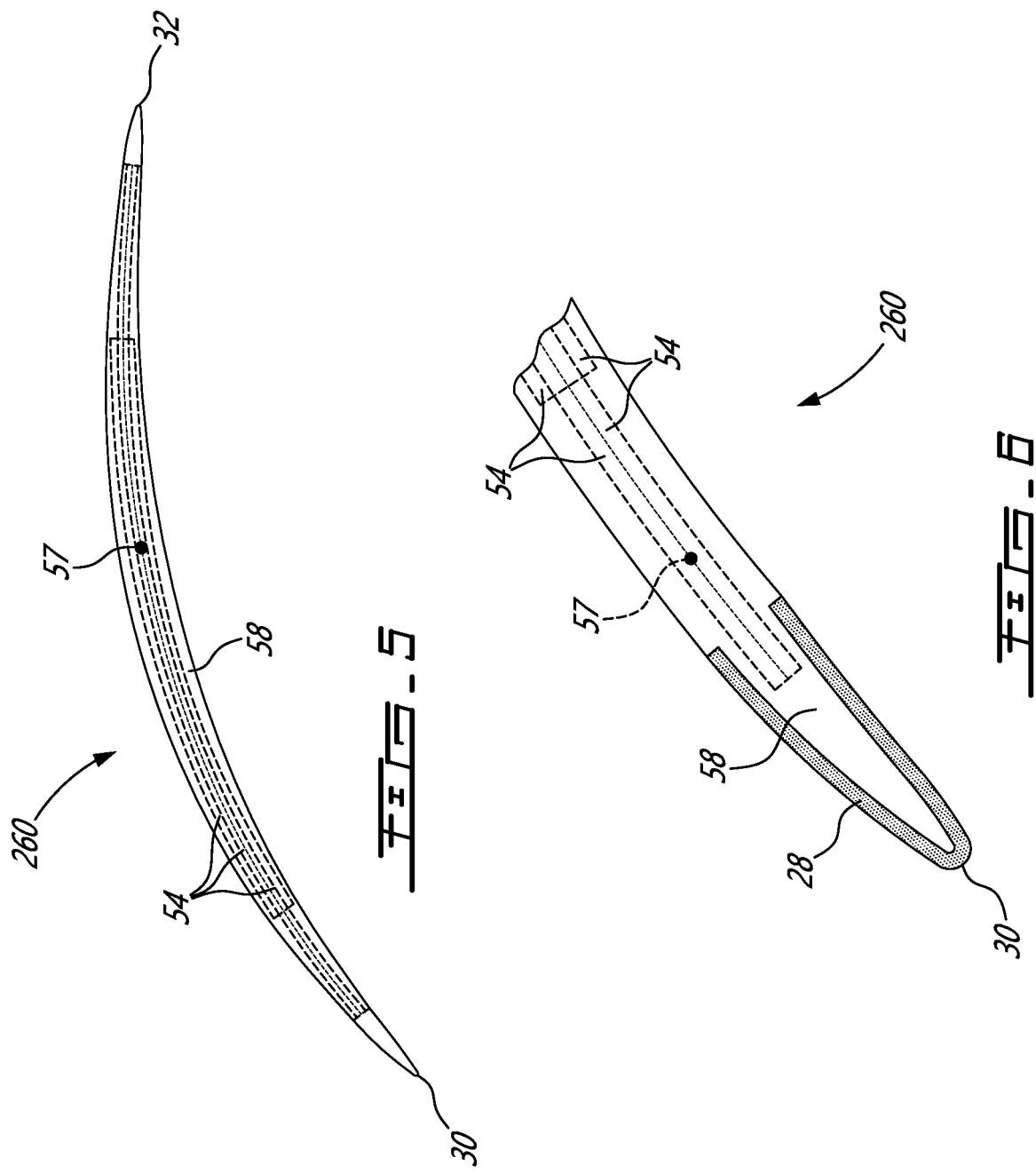

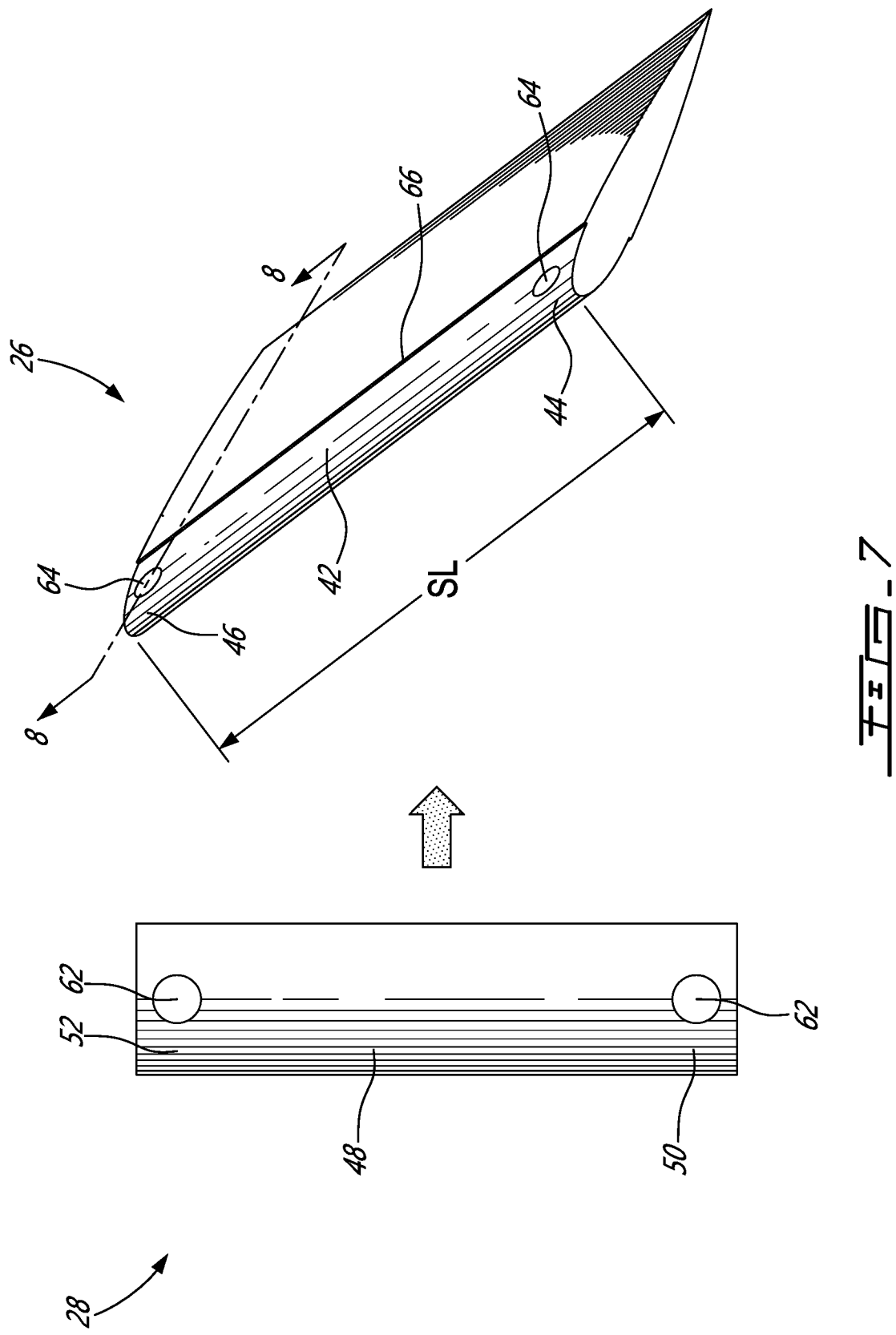

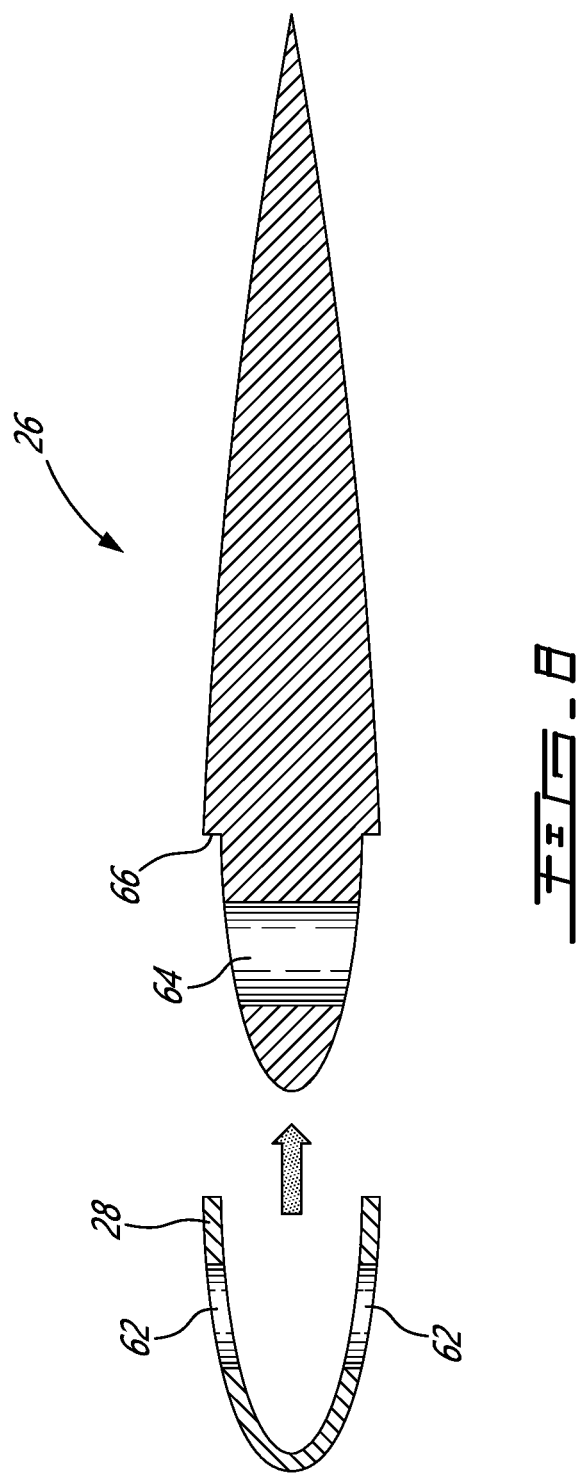

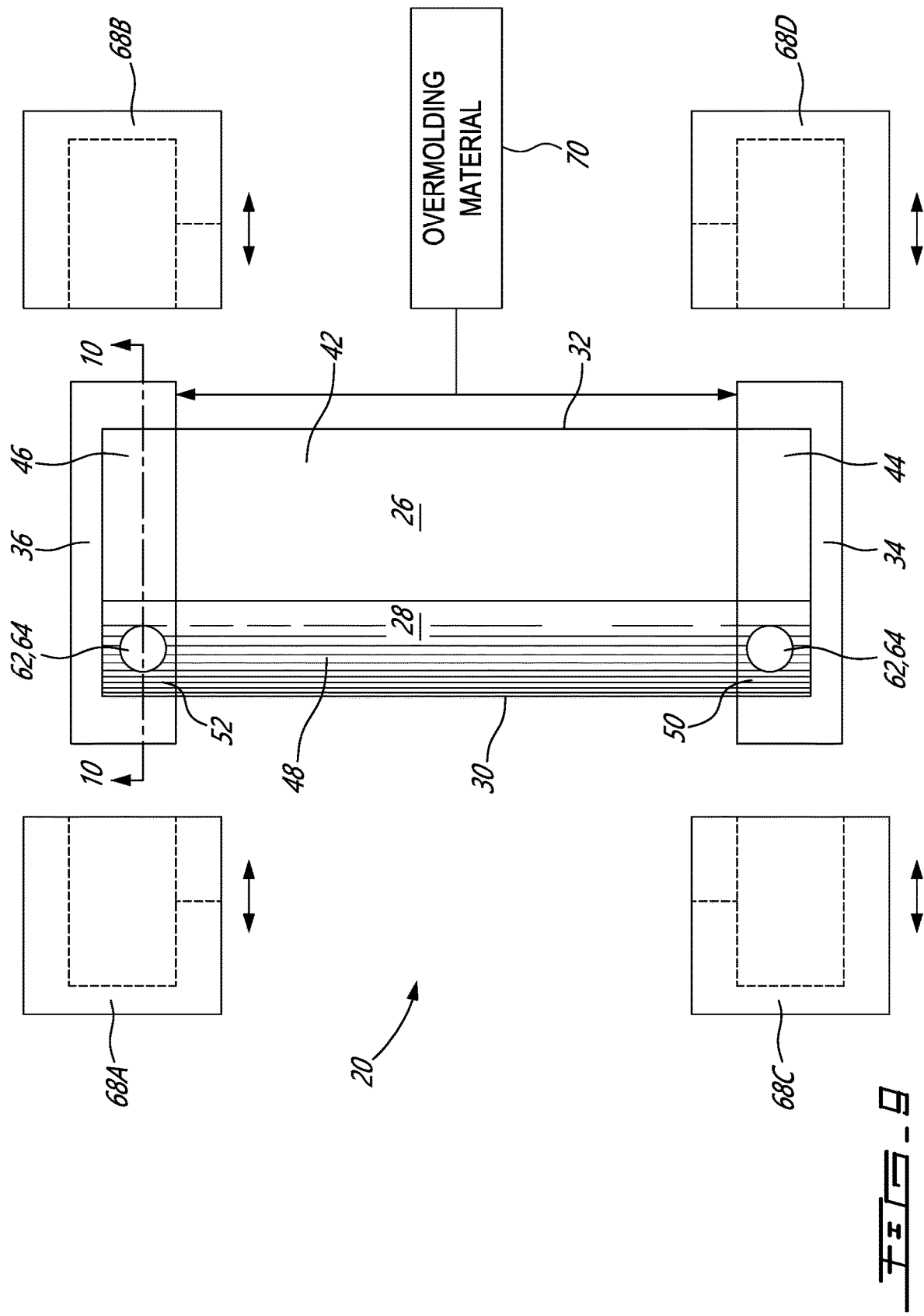

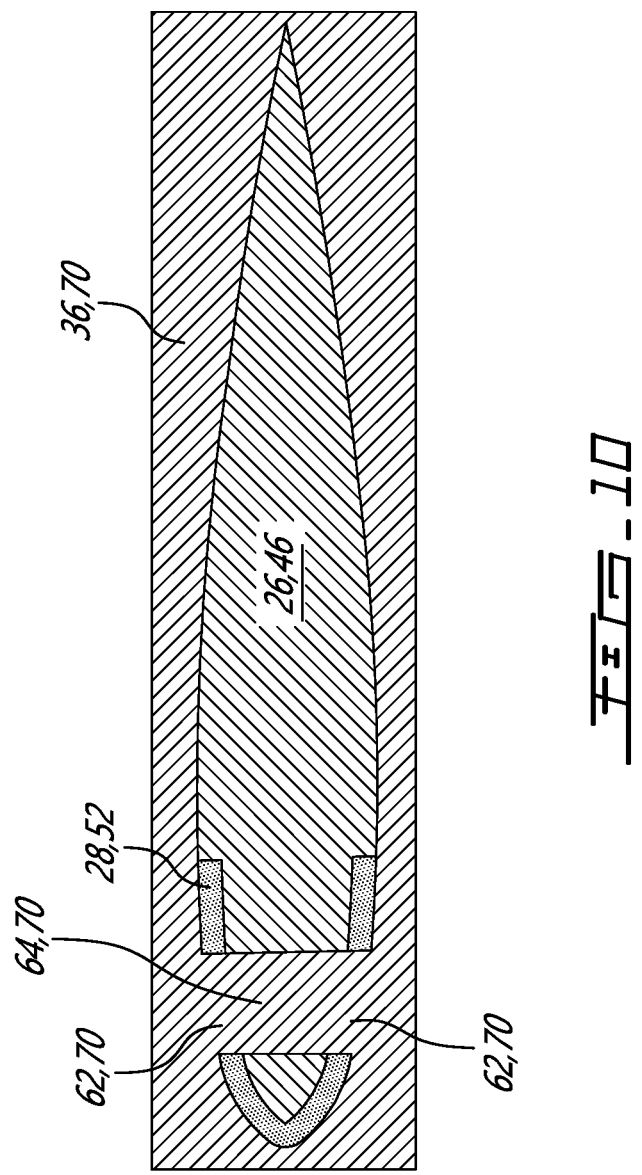

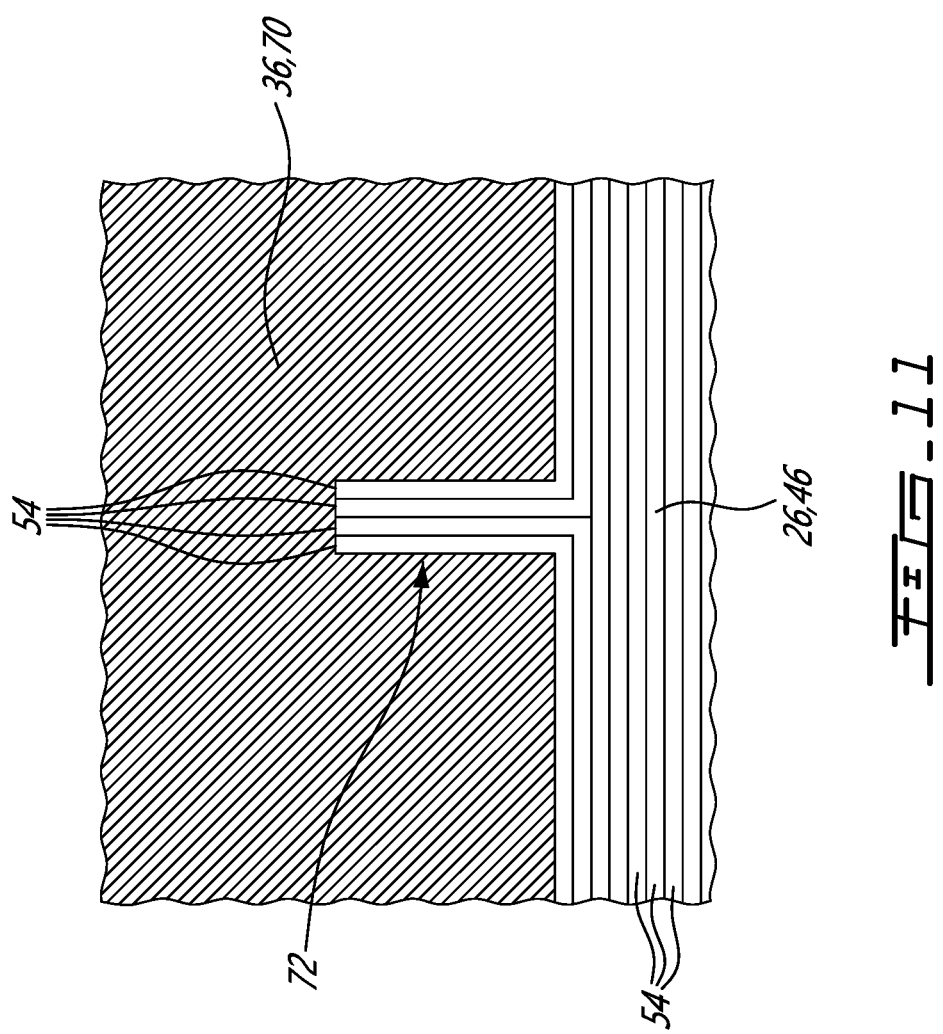

METHOD FOR MANUFACTURING A COMPOSITE GUIDE VANE HAVING A METALLIC LEADING EDGE

TECHNICAL FIELD

The disclosure relates generally to gas turbine engines, and more particularly to composite guide vanes.

BACKGROUND

Guide vanes of a gas turbine engine typically include an airfoil body that is disposed between a radially inner platform defined on a foot of the guide vane and a radially outer platform defined on a head of the guide vane. Guide vanes are typically arranged in rows and serve to guide the gas stream passing through the engine to a desired speed and angle. Guide vanes must also withstand erosion, abrasion, and impact from foreign objects that may enter the gas turbine engine. Guide vanes are generally made of metal, but it is becoming desirable to make them out of composite materials to reduce their weight. Unfortunately, methods of fabricating guide vanes out of composite materials can be complex, require expensive tooling and are time consuming. Improvement is desirable.

SUMMARY

In one aspect, the disclosure describes a method of manufacturing a composite guide vane of a gas turbine engine. The method comprises: receiving a body made of a fiber-reinforced composite material, the body including a body mid portion for interacting with a fluid and a body end portion; applying a metallic sheath on part of the body, the metallic sheath including: a sheath mid portion applied to the body mid portion to define a leading edge of the guide vane; and a sheath end portion applied to the body end portion; and overmolding a head or a foot of the guide vane onto the body end portion and onto the sheath end portion.

In another aspect, the disclosure describes a method of manufacturing a composite guide vane of a gas turbine engine. The method comprises: receiving a layup of fiber-reinforced composite sheets of continuous, substantially parallel and non-interlaced fibers impregnated with a thermoplastic resin; forming a vane body from the layup of sheets, the vane body including a body mid portion for interacting with a fluid and a body end portion; applying a metallic sheath on part of the vane body, the metallic sheath defining a leading edge of the guide vane; and overmolding a head or a foot of the guide vane onto part of the vane body and onto part of the metallic sheath.

In another aspect, the disclosure describes a guide vane for a gas turbine engine. The guide vane comprises: a body made of a fiber-reinforced composite material, the body including a body mid portion for interacting with a fluid and a body end portion; a metallic sheath applied to part of the body, the metallic sheath including: a sheath mid portion applied to the body mid portion and defining a leading edge of the guide vane; and a sheath end portion applied to the body end portion; and a head or foot overmolded onto the body end portion and onto the sheath end portion.

In another aspect, the disclosure describes a method of manufacturing a vane body of a guide vane of a gas turbine engine. The method comprises: receiving a precursor including layers of substantially parallel and non-interlaced reinforcement fibers embedded in a resin; compression molding the precursor into a preform of a core of the vane body; and overmolding a skin of the vane body on the preform of the core.

In another aspect, the disclosure describes a method for manufacturing a vane body of a guide vane of a gas turbine engine. The method comprises: preparing a precursor including a layup of fiber-reinforced composite sheets of long, substantially parallel and non-interlaced fibers impregnated with a first resin; stamping the precursor into a preform of a core of the vane body; and overmolding a skin of the vane body on the preform of the core with a second resin reinforced with randomly oriented short fibers.

In a further aspect, the disclosure describes a guide vane of a gas turbine engine. The guide vane comprises: a core of an airfoil-shaped vane body, the core including layers of long and substantially non-interlaced reinforcement fibers embedded in a first resin; and a skin of the airfoil-shaped vane body, the skin at least partially encapsulating the core and including a second resin either: devoid of any reinforcement fibers embedded therein or reinforced with short randomly oriented fibers.

Further details of these and other aspects of the subject matter of this application will be apparent from the detailed description included below and the drawings.

DESCRIPTION OF THE DRAWINGS

Reference is now made to the accompanying drawings, in which:

FIG. 2 is a perspective view of an exemplary guide vane of the engine of FIG. 1;

FIG. 3B is a flowchart of an exemplary method for manufacturing a body of a guide vane;

FIG. 4 is a schematic representation of a process for forming a composite vane body;

FIG. 5 is a schematic cross-sectional view of an exemplary composite vane body;

FIG. 6 is a schematic cross-sectional view of an exemplary metallic leading edge of the vane body of FIG. 5;

FIG. 7 is a schematic perspective view of another exemplary composite vane body together with an exemplary metallic sheath for application to a forward portion of the vane body;

FIG. 8 is a schematic cross-sectional view of the vane body of FIG. 7 taken along line 8-8 of FIG. 8 with the metallic sheath for application to the forward portion of the vane body;

FIG. 9 is a schematic representation of an exemplary guide vane together with mold portions for overmolding a head and a foot on a composite vane body;

FIG. 10 is a schematic cross-sectional view of the guide vane of FIG. 9 taken along line 10-10 in FIG. 9; and FIG. 11 is a schematic representation of an exemplary anchoring feature of the composite vane body for engaging with the overmolded head or foot.

DETAILED DESCRIPTION

The following disclosure describes constructions of composite guide vanes for gas turbine engines and methods for manufacturing such composite guide vanes. In some embodiments, the methods described herein can facilitate the manufacturing of composite guide vanes in a relatively simpler and time efficient manner using fiber-reinforced unidirectional tape for example. In some embodiments, the methods described herein can also facilitate the retention of a metallic leading edge on a composite guide vane.

The terms "attached", "connected" or "coupled" may include both direct attachment, connection or coupling (in which the two components contact each other) and indirect attachment, connection or coupling (in which at least one additional component is located between the two components). The term "substantially" as used herein may be applied to modify any quantitative representation which could permissibly vary without resulting in a change in the basic function to which it is related.

Aspects of various embodiments are described through reference to the drawings.

Figure 1:
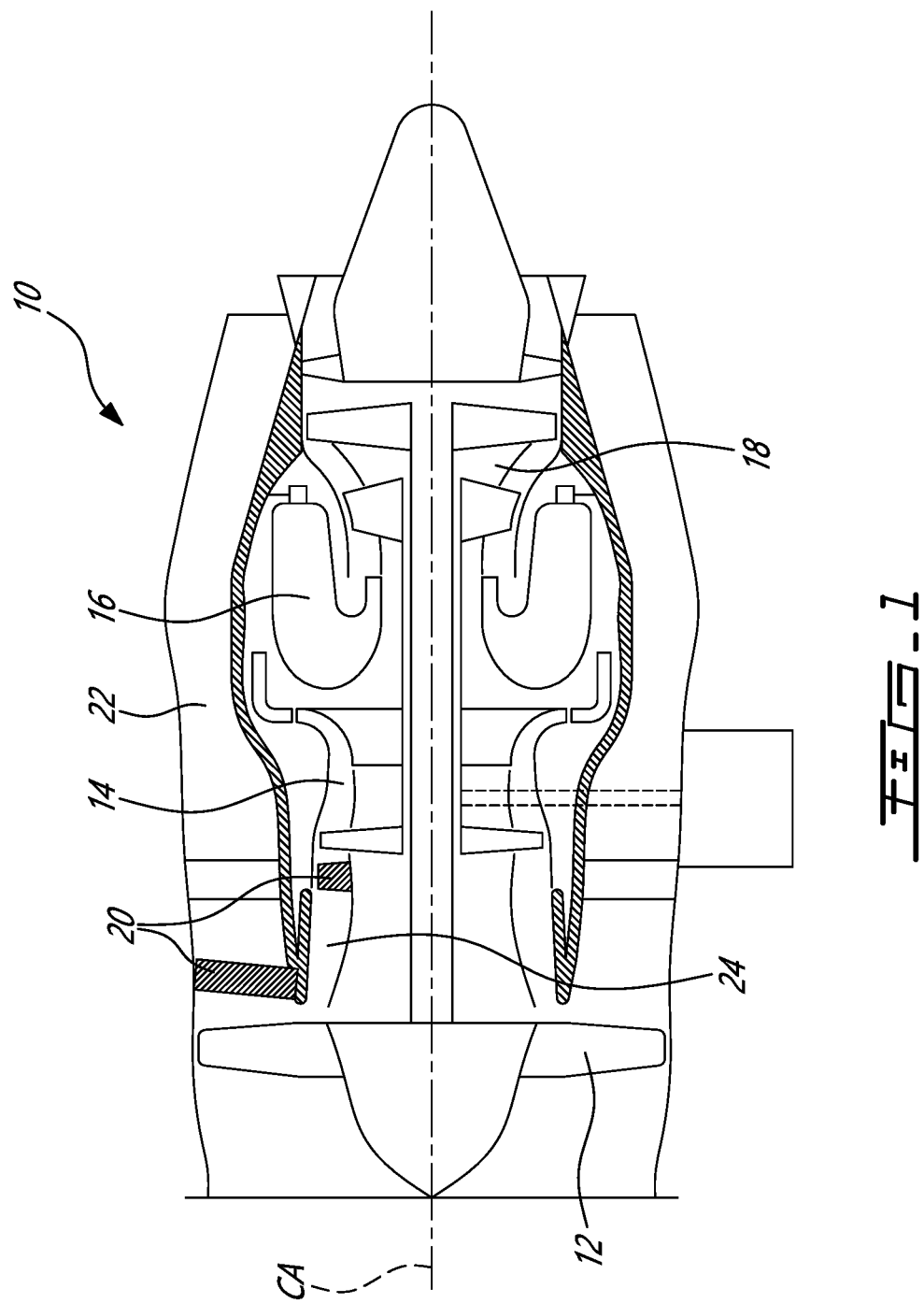
FIG. 1 shows a schematic axial cross-section view of a turbofan gas turbine engine including one or more guide vanes as described herein.

FIG. 1 illustrates a gas turbine engine 10 of a type preferably provided for use in subsonic flight, generally comprising in serial flow communication, a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. Engine 10 may be of a type suitable for use in aircraft applications. For example, engine 10 may be a turbofan (as illustrated), a turboshaft or a turboprop type of engine.

Engine 10 may also include one or more guide vanes 20 (referred hereinafter in the singular) made using one or more methods described herein. Vane 20 may be of a type known as a "guide vane" or "stator vane" that are used to direct fluid flow toward a desired direction so as to be received into downstream rotor blades at a desired angle for example. In some embodiments, vane 20 may be suitable for installation in a core gas path 24 of engine 10. For example, vane 20 may be an (e.g., variable orientation) inlet guide vane disposed upstream of compressor 14. Vane 20 may instead be disposed between two rotor stages of compressor 14. Alternatively, vane 20 may be a bypass stator vane disposed in a bypass duct 22 of turbofan engine 10. In various embodiments, vane 20 may have a fixed orientation within engine 10 or may have a controllably variable orientation within engine 10.

Engine 10 may have central axis CA corresponding to an axis of rotation of one or more spools of engine 10. Bypass duct 22 may extend generally annularly about central axis CA. Core gas path 24 may also extend generally annularly about central axis CA. In some embodiments of engine 10, a plurality of vanes 20 may be angularly distributed about central axis CA in bypass duct 22 and/or in core gas path 24.

FIG. 2 is a perspective view of an exemplary vane 20 of engine 10. Vane 20 may include body 26 for interacting with a flow of fluid. Body 26 may be made from a fiber-reinforced composite material. Vane 20 may also include metallic sheath 28 covering part of body 26. Metallic sheath 28 may define leading edge 30 of vane 20. Metallic sheath 28 may provide resistance against erosion, abrasion and impact from foreign objects that may enter engine 10. Leading edge 30 and trailing edge 32 of vane 20 are illustrated in relation to a general direction F of the flow of fluid interacting with vane 20.

Vane 20 may also have foot 34 and head 36 attached to respective opposite ends of vane 20. In some embodiments, vane 20 may have either foot 34 or head 36 for attachment of vane 20 only from one end of vane 20. In relation to central axis CA of engine 10, foot 34 may be disposed at a radially inner end of body 26 of vane 20. Head 36 may be disposed at a radially outer end of body 26 of vane 20. Foot 34 may serve for the attachment of vane 20 to a radially inner support structure (e.g., inner ring, shroud, engine casing, low pressure compressor housing) and head 36 may be used to attach the same vane 20 to a radially outer support structure (e.g., outer ring, shroud, engine casing. Vane 20 may also include radially inner platform 38 and radially outer platform 40 for interacting with the flow of fluid. Platforms 38, 40 may define flow-interacting surfaces between guide vanes 20 that are adjacent in the angular/circumferential direction about central axis CA. Foot 34 and head 36 may have a generally T-shape, L-shape or any shape suitable to facilitate installation and attachment of vane 20 within engine 10.

Figure 3A:
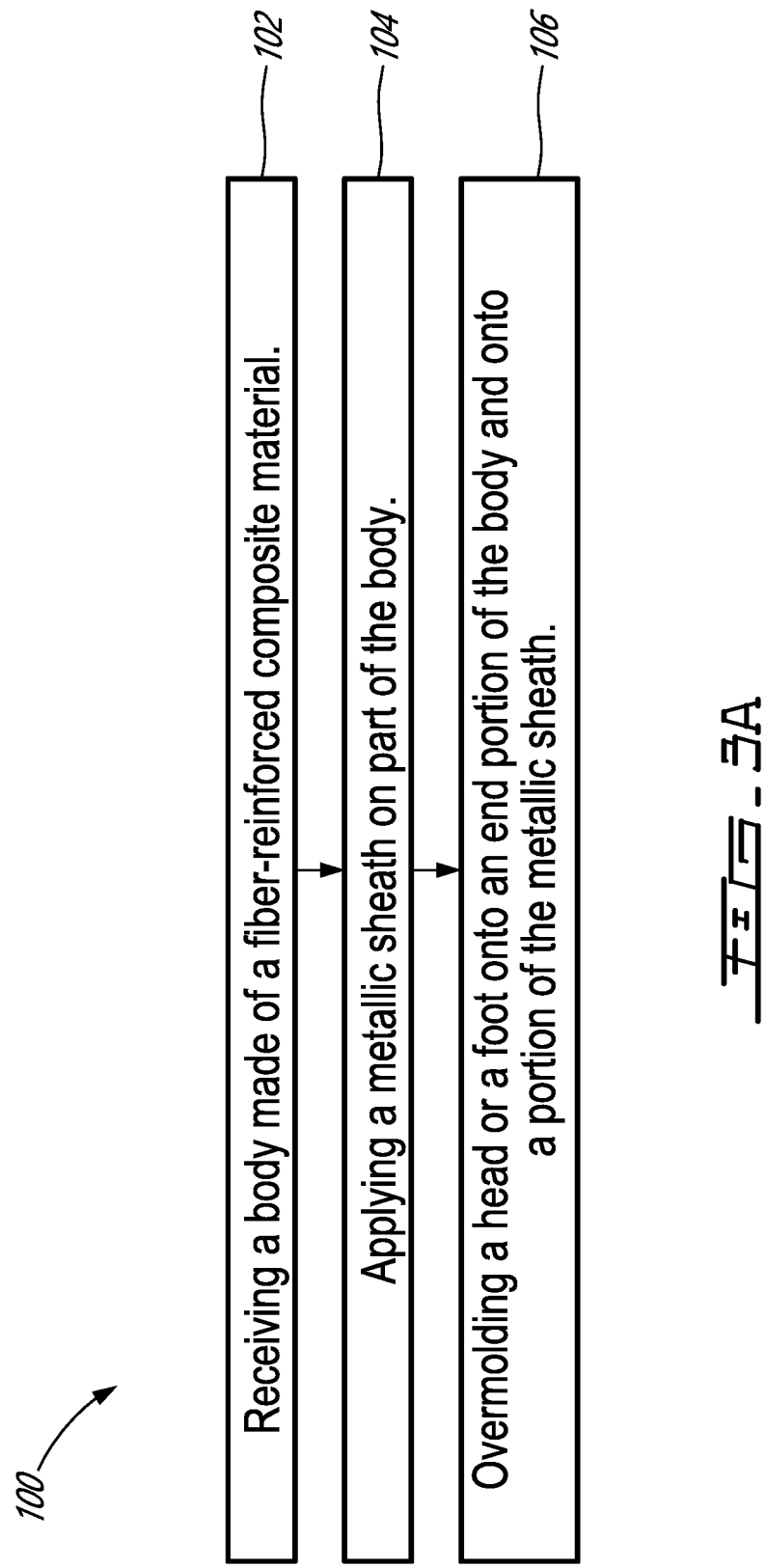
FIG. 3A is a flowchart of an exemplary method for manufacturing a guide vane.

FIG. 3A is a flowchart of an exemplary method 100 for manufacturing vane 20 or another vane made of fiber-reinforced composite material. Aspects of method 100 may be combined with aspects of other methods and may include other actions and/or aspects described herein. Aspects of method 100 are further described below in relation to FIGS. 4-10. In various embodiments, method 100 may include: receiving body 26 (shown in FIG. 2) made of a fiber-reinforced composite material (e.g., see block 102), body 26 including body mid portion 42 for interacting with a fluid and body end portions 44 and/or 46 (shown in FIG. 7); applying metallic sheath 28 on part of body 26 (e.g., see block 104), metallic sheath 28 including: sheath mid portion 48 defining a leading edge of vane 20; and sheath end portions 50 and/or 52 applied respectively to body end portions 44 and/or 46 of body 26 (shown in FIG. 7); and overmolding head 36 and/or foot 34 onto body end portion (s) 44 and/or 46 of body 26 and onto sheath end portion(s) 50 and/or 52 (e.g., see block 106 and FIG. 9).

FIG. 3B is a flowchart of an exemplary method 200 for manufacturing body 26 of vane 20. Aspects of method 200 may be combined with aspects of other methods and may include other actions and/or aspects described herein. Aspects of method 200 are further described below in relation to FIGS. 4-6. In various embodiments, method 200 may include: receiving a precursor (e.g., layup 53 shown in FIG. 4) including substantially parallel and non-interlaced reinforcement fibers embedded in a resin (see block 202); compression molding the precursor into preform 57 of a core of vane body 26 (see block 204 and FIG. 4); and overmolding a skin of vane body 26 on preform 57 of the core (see block 206 and FIG. 4).

In various embodiments of the methods described herein, body 26 may be made from any suitable fiber-reinforced composite material(s) using any suitable process. For example, body 26 may include long and/or short fibers embedded in a suitable (e.g., polymeric) matrix material. Fibers may, for example, be made from glass and/or carbon. Matrix materials may include thermoplastic resins and/or thermosetting resins. In various embodiments, suitable matrix materials for body 26, foot 34 and/or head 36 may include polyether ether ketone (PEEK), such as product numbers 450CA30 or 90HMF40 by VICTREX™, polyamide, epoxy, polyurethane, phenolic and amino resins, and bismaleimides (BMI) for example.

In some embodiments, body 26 may be made by stacking pre-impregnated (e.g., woven) tissue/fabric layers and forming such stack of layers in a mold using heat. Alternatively, a resin transfer molding (RTM) process may be used with dry tissue/fabric layers. In some embodiments, body 26 may be partially or entirely made by injection molding using randomly oriented short fibers embedded in a thermoplastic or thermosetting matrix material. Such short fibers may have lengths of a few millimeters or less. For example, such short fibers may have lengths of about 5 mm or less. In some embodiments, such short fibers may have lengths of about 2 mm or less. In some embodiments, such short fibers may have lengths of about 1 mm or less. In some embodiments, body 26 may be made of a thermosetting or thermoplastic material that is devoid of any fiber reinforcement. In some embodiments, an inner/central core of body 26 may, as described below, include long continuous and optionally unidirectional fibers embedded in a suitable thermosetting or thermoplastic matrix material. The core of body 26 may include a location of a mid section or mid point of a mean camber line of body 26. The core of body 26 may include an innermost region of body 26 located at a depth from the skin of body 26.

FIG. 4 is a schematic representation of an exemplary process for forming body 26 using layup 53 of fiber-reinforced composite sheets 54. Each sheet 54 may be a continuous fiber-reinforced thermoplastic (CFRT) composite. For example, each sheet 54 may be a layer of continuous, substantially parallel and non-interlaced fibers pre-impregnated with a thermoplastic or thermosetting resin. In some embodiments, each sheet 54 may be of a type known as "unidirectional tape" or "UD tape" where a single-layered, fiber-reinforced (e.g., thermoplastic) composite sheet in which long continuous fibers are unrolled, laid and impregnated with a (e.g., thermoplastic) resin. The UD tape may be pre-impregnated with resin. In some embodiments, each sheet 54 may be a woven tissue/fabric cloth that is pre-impregnated with resin. As non-limiting examples, sheets 54 may each have a thickness of about 0.005 inch (0.13 mm) or about 0.010 inch (0.25 mm).

Sheets 54 may be cut automatically on a standard ply cutting table or formed using automated tape laying (ATL) equipment. Sheets 54 may be stacked manually or robotically in a mold. Sheets 54 may be pre-consolidated in a press or tack welded together before placing in the mold. Sheets 54 may be cut and stacked based on the desired final shape of body 26 after forming (e.g., stamping, compression molding) using mold portions 56A, 56B. Layup 53 of sheets 54 may be consolidated (e.g., at least partially densified) into a single unified precursor using heat and pressure prior to loading such consolidated precursor into a press defined by mold portions 56A, 56B for stamping.

The orientation of respective sheets 54 in layup 53 may be selected to tailor the mechanical properties of body 26 in desired loading directions. In various embodiments, sheets 54 in layup 53 may have different orientations (stacking angles). In some situations, the use of sheets 54 with continuous unidirectional fibers and stacking angles may provide control over the final mechanical properties of body 26. In some embodiments, at least some sheets 54 and hence some of the continuous unidirectional fibers may extend continuously along substantially an entire span length SL (shown in FIG. 7) of body 26. For example, at least some of the long fibers from sheets 54 may extend continuously from radially inner body end portion 44, through body mid portion 42 and to radially outer body end portion 46.

FIG. 4 also shows a schematic representation of an optional step of injection overmolding a skin over preform 57 stamped using mold portions 56A, 56B and heat to obtain body 26. Preform 57 may have a substantially solid (i.e., non-hollow) interior. In some situations, body 26 may be formed directly by stamping (e.g., consolidated) layup 53 of pre-impregnated sheets 54 as shown in the upper part of FIG. 4. Body 26 obtained from stamping layup 53 may have acceptable dimensional accuracy for some applications and may approximate the desired final shape of body 26. However, in cases where higher dimensional accuracy is required or body 26 includes relatively sharp edges for example, the optional overmolding step as shown in the lower part of FIG. 4 may be additionally carried out. In this case, the product resulting from the stamping process would be (e.g., a single) preform 57 provided to the subsequent overmolding process. The lower part of FIG. 4 schematically shows body 26 as including preform 57 made from layup 53 of sheets 54 as described above that is encapsulated by overmolding material 58 to achieve the desired geometry of body 26.

FIG. 4 shows schematic transverse cross-section views in relation to body 26. Preform 57 produced by stamping layup 53 of sheets 54 using mold portions 56A, 56B and heat may be received in molds 60A, 60B where overmolding is carried out by the injection of overmolding material 58 when molds portions 60A, 60B are closed. Preform 57 may occupy a core region of body 26 and overmolding material 58 may occupy a skin region of body 26. In some embodiments, preform 57 may occupy a majority of a transverse cross-sectional area of body 26 as shown in FIG. 4. Overmolding material 58 may include a thermoplastic or thermosetting resin containing relatively short reinforcement fibers as described above. The fibers in overmolding material 58 may be shorter than the fibers in preform 57. Alternatively, overmolding material 58 may include a thermoplastic or thermosetting resin that is devoid of reinforcement fibers. The thermoplastic or thermosetting resin selected for overmolding material 58 may be substantially identical or chemically compatible with a resin used in preform 57.

In some situations, the use of optional overmolding may facilitate higher dimensional accuracy of body 26. For example, overmolding material 58 may fill-in regions of body 26 that are not filled-in by preform 57 and thereby substantially establish the final shape of body 26. It is understood that, in some situations, sanding, grinding or other process(es) may be performed on body 26 after the stamping and/or overmolding processes illustrated in FIG. 4.

In some situations, sheath 28 may be placed into mold portions 56A, 56B together with layup 53, and/or into mold portions 60A, 60B together with preform 57 and co-consolidated together with body 26 in the composite forming operation.

FIG. 4 also shows body 26 having a substantially symmetrical airfoil shape but it is understood that body 26 may instead have a cambered airfoil shape as shown in FIG. 5.

FIG. 5 is a schematic cross-sectional view of another exemplary body 260 of vane 20. Body 260 may be made according to the methods described above and may have a construction generally similar to that of body 26 already described above. Like elements are identified using like reference numerals. Body 260 may be made from a plurality of sheet 54 of continuous, substantially parallel and non-interlaced long fibers occupying a core of body 260. The long-fiber core (e.g., preform 57 of FIG. 4) of body 260 may optionally be encapsulated by overmolding material 58.

FIG. 6 is a schematic cross-sectional view of body 260 with an optional metallic leading edge 30. In some embodiments where supplemental leading edge protection is desired, metallic sheath 28 may be applied to part of body 260 so as to define leading edge 30 of body 260. In some embodiments, metallic sheath 28 may be formed from sheet metal made of a titanium-based alloy, an aluminum-based alloy, a nickel-based alloy or stainless steel of the 300 series for example. Metallic sheath 28 may be formed to a desired shape by stamping for example. Alternatively, metallic sheath 28 may be formed as a coating by electrodeposition (i.e., electroforming, electroplating) or chemical vapor deposition. For example, metallic sheath 28 of a desired thickness may be deposited directly onto the applicable portion of body 260. In some embodiments, metallic sheath 28 may be deposited on another substrate of a desired shape and then transferred (e.g., installed and adhesively bonded) onto body 260. In some embodiments, metallic sheath 28 may be deposited as a coating based on the teachings of U.S. Patent Publication No. 2012/0082553 A1 (Title: METAL ENCAPSULATED STATOR VANE), which is incorporated herein by reference. In some embodiments, metallic sheath 28 may be made from a nanocrystalline metallic material. For example, metallic sheath 28 may be applied by nickel plating directly on part (e.g., the leading edge portion) of body 26. In some embodiments, metallic sheath 28 may have a thickness of between 0.001 inch (0.03 mm) and 0.015 inch (0.4 mm). In various embodiments, metallic sheath 28 may have a thickness of about 0.012 inch (0.3 mm), about 0.008 inch (0.2 mm) or about 0.010 inch (0.25 mm)

In some embodiments where deposition (e.g., plating) of metallic sheath 28 directly onto body 26 is conducted, it may be desirable to have a skin of body 26 relatively resin-rich for improved quality of plating of the metallic sheath 28 deposited on body 26. Accordingly, overmolding material 58 may be devoid of fiber reinforcement or may have a relatively low volume fraction of reinforcement fibers.

In some embodiments, metallic sheath 28 may be adhesively bonded to body 260 using a suitable scrim-supported epoxy film adhesive or a polymeric adhesive material disposed between metallic sheath 28 and body 26. Suitable surface preparation/treatment (e.g., abrasion) may be performed on surfaces of metallic sheath 28 and/or of body 26 to be bonded together to facilitate bonding.

FIG. 7 is a schematic perspective view of body 26 together with metallic sheath 28 to be applied to a forward portion of body 26. Metallic sheath 28 may include sheath mid portion 48 for application to and wrapping around a forward portion of body mid portion 42 so that sheath mid portion 48 may define leading edge 30 (shown in FIG. 2) of vane 20. Radially inner sheath end portion 50 may be applied to radially inner body end portion 44. Similarly, radially outer sheath end portion 52 may be applied to radially outer body end portion 46. Body 26 may have a span length SL.

As explained further below, radially inner sheath end portion 50 and radially inner body end portion 44 may be regions to be encapsulated by overmolded foot 34 of vane 20. Similarly, radially outer sheath end portion 52 and radially outer body end portion 46 may be regions to be encapsulated by overmolded head 36 of vane 20. The overmolding of foot 34 or head 36 of vane 20 may provide mechanical retention of metallic sheath 28 onto body 26.

In some embodiments, optional anchoring features may be provided on metallic sheath 28 and/or on body 26 for engagement with overmolded foot 34 and/or head 36 to further enhance the mechanical retention of metallic sheath 28 and body 26 into the overmolded foot 34 and/or head 36. As illustrated in FIG. 7, such anchoring features may include one or more holes 62 formed in metallic sheath 28 and/or one or more holes 64 formed in body 26. Holes 62 may be punched, drilled or machined into metallic sheath 28. Holes 64 may be drilled or machined into body 26. Alternatively, holes 64 in body 26 may be formed through the use of mold inserts or by way of the configuration of mold portions 56A, 56B and/or mold portions 60A, 60B shown in FIG. 4 depending on whether overmolding material 58 is used.

Holes 62, 64 may be of any suitable shape including circular, oval and rectangular for example. Holes 62, 64 may include recesses, elongated channels and/or slots for example. Hole(s) 62 may extend partially or fully through metallic sheath 28. Hole(s) 64 may extend partially or fully through body 26. Instead or in addition to holes 62, 64, anchoring features may include one or more protrusions extending from metallic sheath 28 or from body 26 for engagement with foot 34 and/or head 36.

Hole(s) 62 in metallic sheath 28 and corresponding hole (s) 64 in body 26 may be disposed so that after installation of metallic sheath 28 onto body 26, hole(s) 62 may be at least partially aligned with corresponding hole(s) 64 in body 26 to permit overmolding material from foot 34 or head 36 to enter hole(s) 64 in body 26 by passing through corresponding hole(s) 62 in metallic sheath 28. In some embodiments, hole(s) 62 in metallic sheath 28 may be in complete alignment with respective corresponding hole(s) 64 in body 26. In some embodiments, hole(s) 62 in metallic sheath 28 may be in partial alignment with (i.e., overlap) respective corresponding hole(s) 64 in body 26.

FIG. 8 is a schematic cross-sectional view of body 26 of FIG. 7 taken along line 8-8 of FIG. 8, together with metallic sheath 28 to be applied to the forward portion of body 26. In some embodiments, body 26 may be formed to define joggle 66 to accommodate the presence of metallic sheath 28 and provide a substantially flush (e.g., even or leveled) transition between an upstream outer surface of metallic sheath 28 and a downstream outer surface of body 26. Joggle 66 may be an offset formed on an outer surface of body 26. A size of such offset may be determined based on a thickness of metallic sheath 28 and a bonding substance disposed between metallic sheath 28 and body 26. In some embodiments, the size of the offset provided by joggle 66 may be between 0.010 inch (0.25 mm) and 0.012 inch (0.30 mm). Joggle 66 may provide a step transition between a recessed forward surface of body 26, to which metallic sheath 28 may be bonded, and the remainder of body 26.

FIG. 9 is a schematic representation of an exemplary vane 20 illustrated together with mold portions 68A, 68B for injection overmolding head 36 and mold portions 68C, 68D for injection overmolding foot 34 on body 26 and on metallic sheath 28. Head 36 and foot 34 may be overmolded using overmolding material 70. Overmolding material 70 may include a thermoplastic or thermosetting resin containing relatively short reinforcement fibers as described above. The fibers in overmolding material 70 may be shorter than the fibers in preform 57 (shown in FIG. 4). Alternatively, overmolding material 70 may include a thermoplastic or thermosetting resin that is devoid of reinforcement fibers. The thermoplastic or thermosetting resin selected for overmolding material 70 may be substantially identical or chemically compatible with a resin used in body 26.

FIG. 9 shows head 36 and foot 34 as being transparent for the purpose of illustrating the components encapsulated into head 36 and foot 34 by way of overmolding. For example, radially inner sheath end portion 50 and radially inner body end portion 44 may be disposed inside of overmolded foot 34 and mechanically retained inside of foot 34. Similarly, radially outer sheath end portion 52 and radially outer body end portion 46 may be disposed inside of overmolded head 36 and mechanically retained inside of head 36.

FIG. 10 is a schematic cross-sectional view of vane 20 of FIG. 9 taken along line 10-10 in FIG. 9. Radially outer sheath end portion 52 and radially outer body end portion 46 are shown as being encapsulated by overmolded head 36 and mechanically retained inside of head 36. Optional holes 62, 64 are shown as being filled with overmolding material 70 used to form head 36. In some embodiments, the presence of holes 62, 64 may provide stronger retention of sheath end portion 52 and radially outer body end portion 46 into head 36 by providing further mechanical engagement (e.g., anchoring, interlocking) between head 36 and sheath end portion 52, and also between head 36 and radially outer body end portion 46.

FIG. 11 is a schematic representation of another exemplary type of anchoring feature that may be used instead of, or in addition to holes 64. Such anchoring feature may include one or more tabs 72 projecting outwardly from body end portion 46 and for engaging with overmolding material 70 of head 36 for example. Tab 72 may be made by having composite sheet(s) 54 extend outwardly from layup 53 and molded into tab 72 during the forming of body 26 or preform 57 shown in FIG. 4. The formation of one or more tabs 72 may require a subsequent forming/molding of sheets 54 required to form tab 72 on preform 57 or body 26 in addition to the molding step shown in the upper portion of FIG. 4.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

What is claimed is:

1. A method of manufacturing a composite guide vane of a gas turbine engine, the method comprising:
receiving a body made of a fiber-reinforced composite material, the body including a body mid portion for interacting with a fluid and a body end portion;
applying a metallic sheath on part of the body, the metallic sheath including:
a sheath mid portion applied to the body mid portion to define a leading edge of the guide vane; and
a sheath end portion applied to the body end portion;
forming a hole in the sheath end portion;
overmolding a head or a foot of the guide vane onto the body end portion and onto the sheath end portion; and
receiving overmolding material into the hole during the overmolding.

2. The method as defined in claim 1, wherein:
the body end portion is a first body end portion;
the body includes a second body end portion opposite the first body end portion;
the sheath end portion is a first sheath end portion;
the metallic sheath includes a second sheath end portion applied to the second body end portion;
the method includes:
overmolding the head onto the first body end portion and onto the first sheath end portion; and
overmolding the foot onto the second body end portion and onto the second sheath end portion.

3. The method as defined in claim 1, wherein:
the hole in the sheath end portion is a sheath hole;
the method comprises:
forming a body hole in the body end portion; and
receiving overmolding material into the body hole during the overmolding.

4. The method as defined in claim 3, wherein the body hole is at least partially aligned with the sheath hole.

5. The method as defined in claim 1, wherein:
the body end portion is a first body end portion;
the body includes a second body end portion opposite the first body end portion;
the body mid portion is disposed between the first body end portion and the second body end portion;
a core of the body includes substantially parallel fibers embedded in a matrix material; and
at least some of the substantially parallel fibers extend continuously from the first body end portion to the second body end portion.

6. The method as defined in claim 5, wherein:
a skin of the body includes randomly oriented fibers embedded in another matrix material; and
the randomly oriented fibers are shorter than the substantially parallel fibers.

7. The method as defined in claim 6, wherein the body end portion includes an anchoring feature engaged with the head or foot.

8. The method as defined in claim 1, wherein the sheath end portion includes an anchoring feature engaged with the head or foot.

9. The method as defined in claim 1, wherein applying the metallic sheath on part of the body includes nickel plating the metallic sheath on part of the body.

10. A method of manufacturing a composite guide vane of a gas turbine engine, the method comprising:
receiving a layup of fiber-reinforced composite sheets of continuous, substantially parallel and non-interlaced fibers impregnated with a thermoplastic resin;
forming a vane body from the layup of sheets, the vane body including a body mid portion for interacting with a fluid and a body end portion;
applying a metallic sheath on part of the vane body, the metallic sheath defining a leading edge of the guide vane; and
overmolding a head or a foot of the guide vane onto part of the vane body and onto part of the metallic sheath, wherein forming the vane body includes:
stamping the layup of sheets into a preform of a core of the vane body; and then
overmolding a skin on the preform.

11. A guide vane for a gas turbine engine, the guide vane comprising:
a body made of a fiber-reinforced composite material, the body including a body mid portion for interacting with a fluid and a body end portion;
a metallic sheath applied to part of the body, the metallic sheath including:
a sheath mid portion applied to the body mid portion and defining a leading edge of the guide vane; and
a sheath end portion applied to the body end portion; and
a head or foot overmolded onto the body end portion and onto the sheath end portion,
wherein the sheath end portion includes a hole and overmolding material of the head or foot extends into the hole.

12. The guide vane as defined in claim 11, comprising both the head and the foot, wherein:
the body end portion is a first body end portion;
the body includes a second body end portion opposite the first body end portion;
the sheath end portion is a first sheath end portion;
the metallic sheath includes a second sheath end portion applied to the second body end portion;

the head is overmolded onto the first body end portion and onto the first sheath end portion; and the foot is overmolded onto the second body end portion and onto the second sheath end portion.

13. The guide vane as defined in claim 12, wherein the body includes a joggle accommodating the metallic sheath.

14. The guide vane as defined in claim 11, wherein the sheath end portion includes an anchoring feature engaged with the head or foot.

15. The guide vane as defined in claim 11, wherein the body end portion includes an anchoring feature engaged with the head or foot.

16. The guide vane as defined in claim 11, wherein:

the hole is a through sheath hole;

the body end portion includes a body hole at least partially aligned with the sheath hole; and overmolding material of the head or foot extends into the sheath hole and into the body hole.

17. The guide vane as defined in claim 11, wherein:

the body end portion is a first body end portion;

the body includes a second body end portion opposite the first body end portion;

the body mid portion is disposed between the first body end portion and the second body end portion;

a core of the body includes long fibers embedded in a matrix material; and a skin of the body includes randomly oriented short fibers embedded in another matrix material.

18. A guide vane for a gas turbine engine, the guide vane comprising:

a body made of a fiber-reinforced composite material, the body including a body mid portion for interacting with a fluid and a body end portion;

a metallic sheath applied to part of the body, the metallic sheath including:

a sheath mid portion applied to the body mid portion and defining a leading edge of the guide vane; and a sheath end portion applied to the body end portion; and a head or foot overmolded onto the body end portion and onto the sheath end portion, wherein:

the body end portion is a first body end portion;

the body includes a second body end portion opposite the first body end portion;

the body mid portion is disposed between the first body end portion and the second body end portion;

a core of the body includes long fibers embedded in a matrix material; and a skin of the body includes randomly oriented short fibers embedded in another matrix material.

\* \* \* \* \*